United States Patent
Mankame

(10) Patent No.: US 9,644,655 B2
(45) Date of Patent: May 9, 2017

(54) APPROACHES FOR WELDING SANDWICH STRUCTURES

(71) Applicant: GM GLOBAL TECHNOLOGY OPERATIONS LLC, Detroit, MI (US)

(72) Inventor: Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 246 days.

(21) Appl. No.: 14/497,015

(22) Filed: Sep. 25, 2014

(65) Prior Publication Data

US 2016/0089868 A1    Mar. 31, 2016

(51) Int. Cl.
*F16B 5/08* (2006.01)
*B23K 37/00* (2006.01)
*B23K 103/16* (2006.01)

(52) U.S. Cl.
CPC .............. *F16B 5/08* (2013.01); *B23K 37/003* (2013.01); *B23K 2203/172* (2015.10)

(58) Field of Classification Search
CPC ............ B23K 11/0093; B23K 37/0408; B23K 26/324; B23K 31/02; B23K 26/21; B23K 2203/10; B23K 2203/172; B23K 2201/02; B23K 1/0014; B29C 66/43; B32B 3/12; B32B 37/146; B32B 15/046; B60R 2019/1886; B60R 2019/1873; E04C 2/3405; E04C 2002/3488; E04C 2/34; E04C 2/08
See application file for complete search history.

(56) References Cited

U.S. PATENT DOCUMENTS 7,382,959 B1   6/2008   Jacobsen
7,653,279 B1   1/2010   Jacobsen
9,457,434 B2 * 10/2016  Mankame .......... B23K 37/0408

* cited by examiner

*Primary Examiner* — Jacob T Minskey
*Assistant Examiner* — Vishal I Patel
(74) *Attorney, Agent, or Firm* — John A. Miller; Miller IP Group, PLC

(57) ABSTRACT

Methods for welding sandwich structures together, especially vehicle structures, where the structures include two opposing face sheets with a core, such as a micro-truss core, therebetween. In one embodiment, two sandwich structures are butt welded together. A cooling fluid barrier is provided at an end of the core between the face sheets to prevent cooling fluid from entering the core during the welding process, where the cooling barrier can be a micro-truss structure and can include cooling fluid channels. A welding insert is inserted into the end of one of the structures adjacent to the cooling barrier, and is welded to the other structure to secure the structures together.

22 Claims, 4 Drawing Sheets

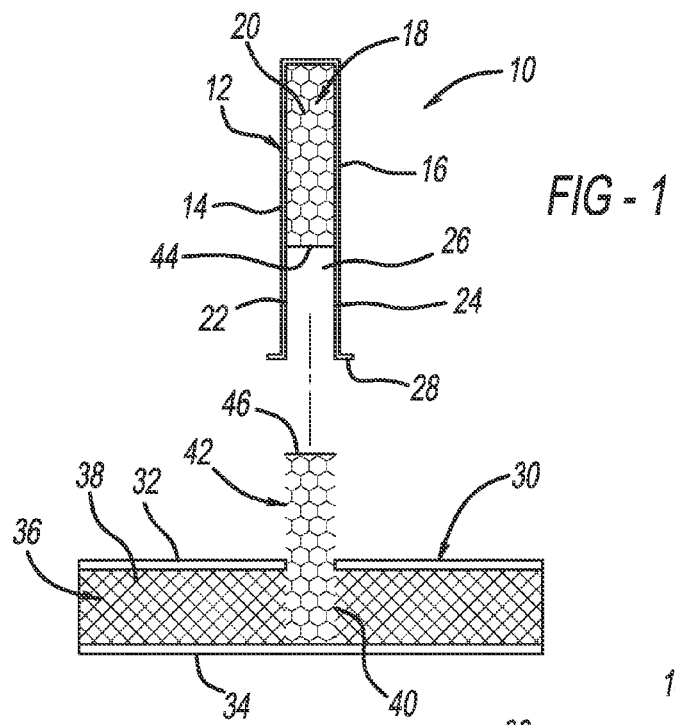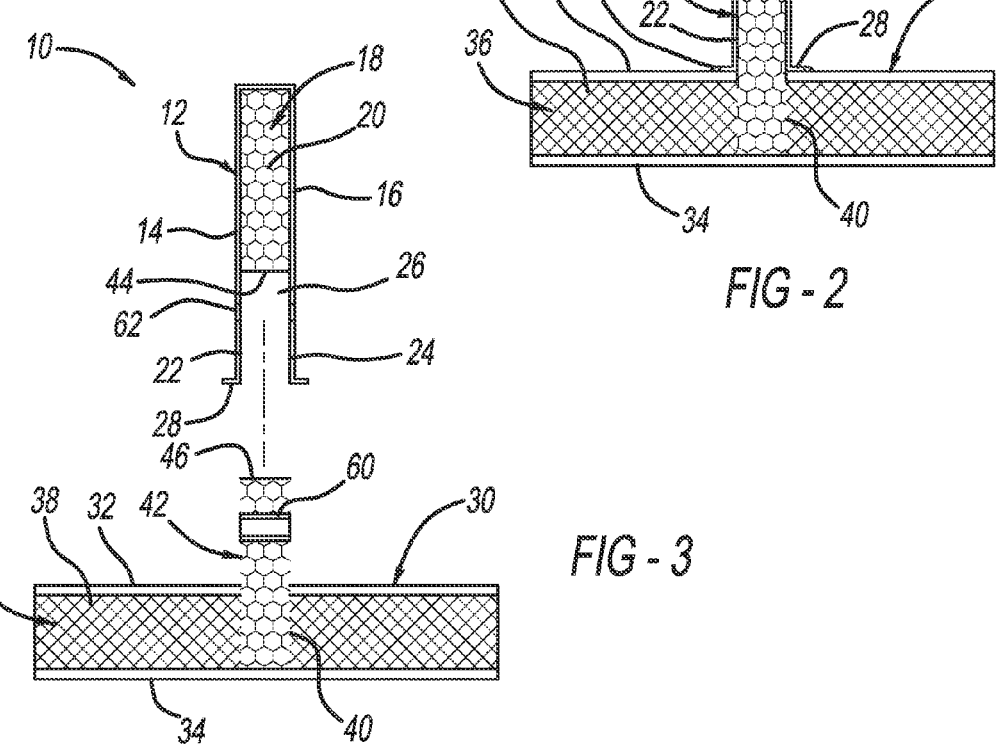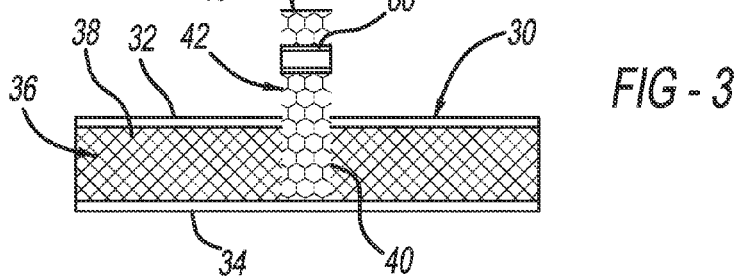

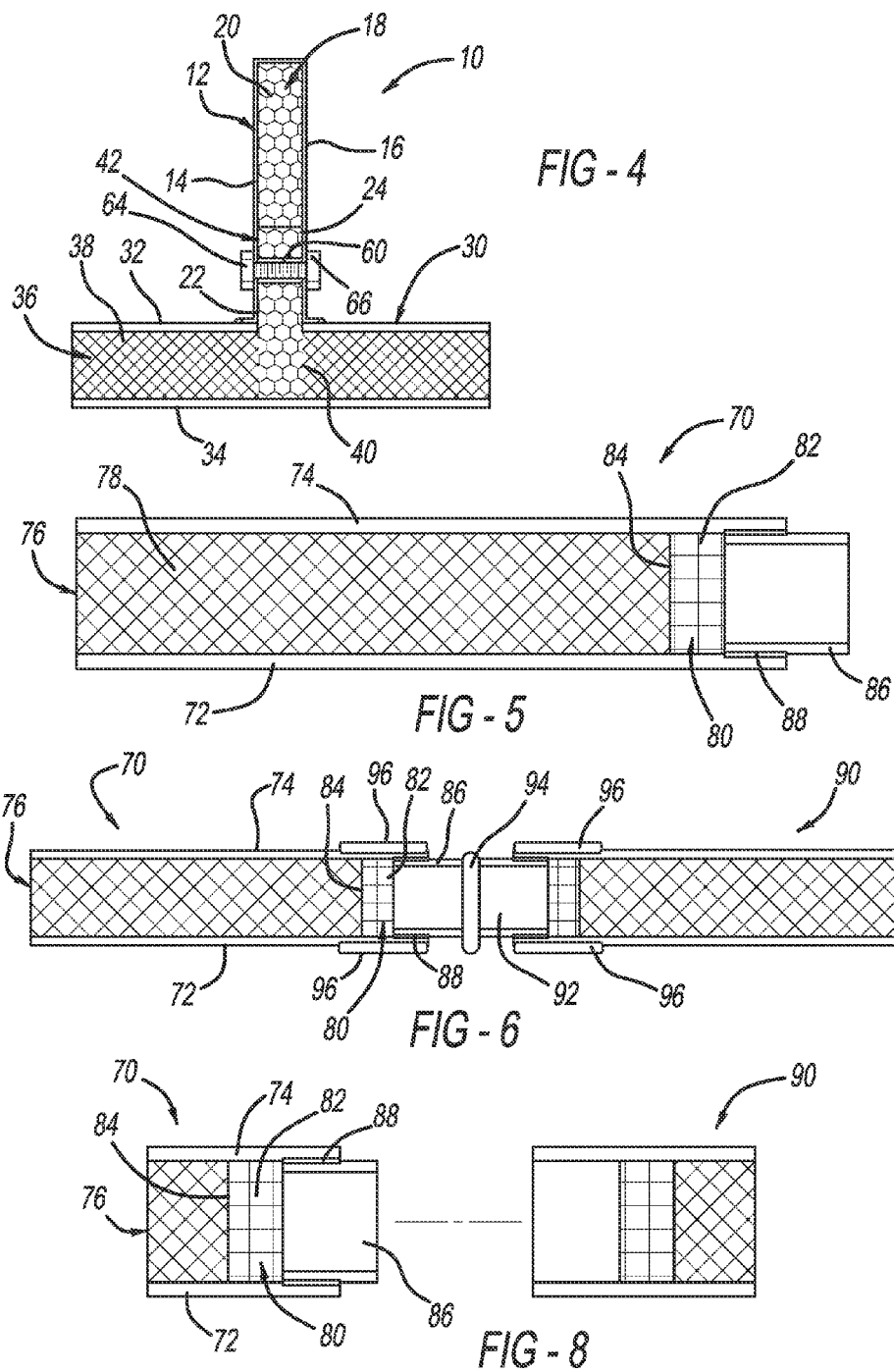

APPROACHES FOR WELDING SANDWICH STRUCTURES

BACKGROUND OF THE INVENTION

Field of the Invention

This invention relates generally to techniques for joining sandwich structures having an inner core and, more particularly, to techniques for butt welding sandwich structures, such as vehicle structures, that includes providing a cooling fluid barrier at an end of the core that prevents cooling fluid from entering the core during the welding process.

Discussion of the Related Art

Vehicles include various support structures, such as vehicle floor beams and side beams, that provide support and to which other structures are mounted. For example, vehicle floor beams are sometimes welded to vehicle side rails. Various parts of the vehicle require different degrees of strength, where it is typically desirable to make those structures as light weight as possible. Some of those structures may be sandwich structures, where the particular structure includes an outer layer, such as an aluminum layer, and an inner core, sometimes made of a light weight material, such as a foam, and other times a structural core, such as micro-truss structures. Using such sandwich structures as structural elements is beneficial in that it typically reduces the mass of the vehicle without compromising strength. In some cases, it becomes necessary to join two sandwich structures together by a high integrity bond. If the process for joining such sandwich structures together cannot provide a high integrity joint, then the ability to provide such light weight high strength structures becomes irrelevant. This problem becomes even greater if the sandwich structures are different.

It is known in the art to fabricate a three-dimensional micro-truss polymer structure for various structural uses. For example, U.S. Pat. Nos. 7,653,279 and 7,382,959 disclose a process for fabricating such a micro-truss structure. Generally, the process includes providing a reservoir or mold filled with a volume of a curable monomer and covered by a mask including strategically positioned apertures. Light sources are positioned relative to the mask and light from the light sources shinning through the apertures cures and hardens interconnected polymer columns, referred to herein as struts, to form a rigid support structure. Once the columns are cured, the struts are formed and the light sources are turned off, the reservoir is emptied of the non-cured monomer that did not receive the light so that the resulting hard polymer structure forms the micro-truss structure having an array of spaced apart struts.

SUMMARY OF THE INVENTION

The present disclosure describes various embodiments for welding sandwich structures together, especially vehicle structures, where the structures include two opposing face sheets with a core, such as a micro-truss core, therebetween. In one embodiment, two sandwich structures are butt welded together. A cooling fluid barrier is provided at an end of the core between the face sheets to prevent cooling fluid from entering the core during the welding process, where the cooling barrier can be a micro-truss structure and can include cooling fluid channels. A welding insert is inserted into the end of one of the structures adjacent to the cooling barrier, and is welded to the other structure to secure the structures together.

Additional features of the present invention will become apparent from the following description and appended claims, taken in conjunction with the accompanying drawings.

BRIEF DESCRIPTION OF THE DRAWINGS

FIG. 1 is an exploded view showing a technique for joining two sandwich structures;

FIG. 2 is an illustration showing the two sandwich structures in FIG. 1 joined together;

FIG. 3 is the exploded view shown in FIG. 1 also including openings for a fastener;

FIG. 4 is the illustration shown in FIG. 2 and including the fastener;

FIG. 5 is an illustration of a sandwich structure including a welding insert;

FIG. 6 is an illustration showing the structure in FIG. 5 butt welded to a second sandwich structure;

FIG. 8 is an exploded view of two sandwich structures to be welded together;

DETAILED DESCRIPTION OF THE EMBODIMENTS

Figure 7:
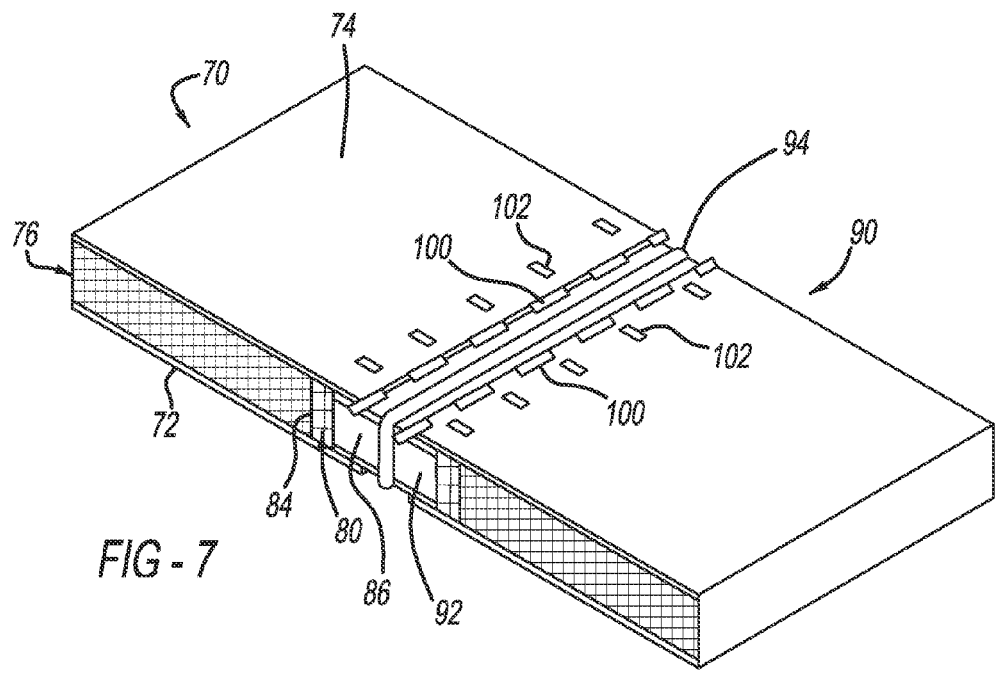
FIG. 7 is an isometric view of the two sandwich structures in FIG. 6 welded together.

The following discussion of the embodiments of the invention directed to various techniques for joining sandwich structures is merely exemplary in nature, and is in no way intended to limit the invention or its applications or uses. For example, the various sandwich structures are sometimes described as vehicle structures. However, as will be appreciated by those skilled in the art, the inventions as discussed herein may have application for other types of structures.

FIG. 1 is an exploded view of an assembly 10 including a sandwich structure 12 and a sandwich structure 30 to be perpendicularly joined together. The structures 12 and 30 can be vehicle structures and at any suitable location on the vehicle. The structure 12 includes spaced apart and opposing face sheets 14 and 16 and a micro-truss core 18 therebetween, where the core 18 has been formed by conventional micro-truss structure fabrication procedures to have an array of spaced apart struts 20, where the micro-truss core 18 is defined by a geometry of repeating unit cells, such as defined by the number, orientation and dimensions of the struts 20. The core 18 does not extend the entire length of the face sheets 14 and 16 so that the face sheet 14 includes an overhang extension 22 beyond the length of the core 18 and the face sheet 16 includes an overhang extension 24 beyond the length of the core 18 so as to define an open area 26 therebetween, as shown. A mounting flange 28 is provided at the ends of the extensions 22 and 24.

The sandwich structure 30 includes a top face sheet 32, a bottom face sheet 34 and a micro-truss core 36 positioned therebetween, where the micro-truss core 36 includes a micro-truss core extension 42 positioned within an opening 40. The core 36 is also a micro-truss core formed by known micro-truss fabrication techniques to have an array of struts 38. The properties of the micro-truss core 36 are defined by the geometry of a repeating unit cell, such as the number and orientation of the struts 38 in a cell and the dimensions of the struts 38, and the material from which the unit cells are made. The core 36 has two contiguous segments that have different unit cell geometries. The extension 42 has one type of unit cell, which is identical to the unit cell in the core 18 of the sandwich structure 12, while the rest of the core 36 has a different unit cell. These two segments are formed in the same micro-truss fabrication process, i.e., at the same time, by choosing a different mask, UV light patterns and light intensity profiles for the regions with the two different unit cells. The transition from one segment to the other may be sharp, i.e. it occurs in less than a few unit cells, or may be spread over multiple unit cells. In the latter case, the two unit cells jointly inhabit the same space in the transition region. Alternatively, but less desirably, the core 36 can be fabricated by making the two segments with different unit cells in two separate fabrication steps. If this approach is used, there should be a transition region where the two unit cells regions inhabit the same space.

The micro-truss core extension 42 is fabricated by known micro-truss fabrication processes using an appropriately sized cavity in the mold for the extension. A part of the core extension 42 extends above the face sheet 32. When the core 36 is being fabricated by the micro-truss fabrication process discussed above, suitable masks are provided for both the segment corresponding to the extension 42 and the rest of the core 36 so that the core extension 42 has the same unit cell type as the core 18 in the structure 12. In alternative embodiments, it is possible that the configuration of the cores 18 and 36 is the same. In an extreme case, the core extension 42 occupies the entire space between the face sheets 22 and 24, i.e., the core 18 is absent. In the embodiment shown in FIGS. 1 and 2, the core extension 42 is properly oriented relative to the cores 18 and 36 so that when the sandwich type structures 12 and 30 are joined, the core 18 and the core extension 42 are oriented properly relative to each other. Once the core 36 including the core extension 42 are fabricated, then the face sheet 32 is bonded by any suitable process to a top surface of the core 36, as shown, either as two separate pieces or as a single piece depending on the size and shape of the structure 30. It is noted that FIG. 1 depicts the structures 12 and 30 along their edge, where the length and size of the structures 12 and 30 would depend on the particular application.

Once the two structures 12 and 30 have been fabricated, they are joined together by placing the structure 12 onto the core extension 42 so that the part of the core extension 42 that extends above the face sheet 32 is inserted into the opening 26. The assembly 10 is shown in FIG. 2 after this joining process. As is apparent, an end of the core extension 42 butts against an end of the core 18 within the opening 26 and the flange 28 are positioned against the face sheet 32. An adhesive can be employed along bond line 50 to secure the core extension 42 to the structure 12. Mating faces 44 and 46 of the core 18 and the core extension 42, respectively, may be provided with flat ends that are fabricated along with those elements during the respective micro-truss fabrication processes. These flat ends simplify the process of bonding the core 18 and the core extension 42. Additional bonding along the edges of the core extension 42 may be provided. A tape adhesive (not shown) may be used to provide better control over the bond line thickness. Further, a sealant bead 54 can be provided along the flange 28 to seal the joint between the structures 12 and 30 against intrusion of dirt, moisture, water etc. Alternately, laser welding can be employed to secure the flanges 28 to the face sheet 32.

An alternative embodiment for joining the sandwich structure 12 to the sandwich structure 30 is shown in FIGS. 3 and 4, where like elements are identified by the same reference number. In this embodiment, when the core extension 42 is being fabricated an opening for a fastener stand-off 60, i.e., a cylindrical bushing, is formed in the core extension 42 above the face sheet 32. The stand-off 60 is then inserted into the opening. Alternatively, the core extension 42 may be grown around the stand-off, which is placed as an insert in the mold. Holes 62 are formed in the extensions 20 and 22 so that when the structure 12 is positioned on the core extension 42, the holes 62 align with the stand-off 60. A fastener, such as a bolt or a rivet 64, then can be inserted through the holes 62 and the stand-off 60 and secured thereto using a nut 66. If a reversible fastener is used, then the connection can be undone by removing the fastener. The two joining approaches described above can be used in conjunction.

FIG. 5 is a side view of a sandwich structure 70 including a bottom face sheet 72 and a top face sheet 74 and a core 76 that is to be butt-welded to another sandwich structure of the same configuration. In this embodiment, the core 76 is a micro-truss core including struts 78 and formed by the known micro-truss fabrication techniques referred to above. However, in other embodiments, the core 76 can be other types of structural cores known in the art. In order to effectively allow welding to the other structure, the structure 70 is fabricated so that the core 76 does not extend all the way through the face sheets 72 and 74, as shown. The core 76 is fabricated to include a cooling region 80. The cooling region 80 provides some structural support to the face sheets 72 and 74 like the rest of the core 76, but its primary function is to provide a flow conduit 82 that contains and guides the flow of a cooling fluid. This cooling fluid carries away a lot of the heat generated during the welding process, thereby limiting the heat that gets communicated to the core 76 outside the weld region. This prevents thermal damage to the core 76 during welding.

A solid barrier 84 that is impermeable to the flow of the cooling fluid is provided at one end of the cooling region 80 so that cooling fluid cannot enter the rest of the core 76. The solid barrier 84 may not be needed if contact with the cooling fluid during the welding process does not compromise the performance or durability of the core 76, e.g. if air is the cooling fluid. The cooling region 80 may be fabricated along with the rest of the core 76 using the same micro-truss fabrication process albeit possibly with a different mask pattern and a different light source. Alternatively, the cooling region 80 may be fabricated elsewhere and placed in the mold when the micro-truss core 76 is being fabricated such that the micro-truss grows adjacent to and around it. In this case, the cooling region 80 may be made of a non-polymeric material such as a metal that has better thermal transport properties (e.g. thermal conductivity and thermal diffusivity). The cooling region 80 may be bonded to one or both of the face sheets 72 and 74.

The other end of the cooling region 80 is in thermal contact with an insert 86 of a weldable material that is secured to the face sheets 72 and 74 by adhesive bonding, laser welding or similar low heat joining processes. A bond interface 88 is provided, as shown in FIG. 5. The choice of the material used in the insert 86 is dictated by the ease with which it can be secured to the face sheets 72 and 74, how hot the joint gets during the formation of the bond and the ease with which the material can be welded to itself. A material that can form strong adhesive bonds with the face sheets 72 and 74 at a low maximum cure temperature, has high thermal conductivity and can be easily welded to itself under shop floor conditions is a good candidate material for the insert 86. The insert 86 may take the shape of an extruded section, such as a tube. The insert 86 may be secured to the cooling region 80 by adhesive bonding, fusion bonding or the like. The insert 86 can be a separate piece inserted between the face sheets 72 and 74 or can be integrated into the structure 70 during its manufacture.

FIG. 6 shows the structure 70 welded to a similar sandwich structure 90 having the same elements as the structure 70 including a welding insert 92. A butt weld joint 94 is formed by known welding procedures to join the welding inserts 86 and 92 at their ends. During the welding operation that welds the inserts 86 and 92 together, a cooling fluid, such as water or air flows through the channels 82 in the cooling region portion of the core in both the structures 70 and 90. Optionally, cooling can be provided external to the structures 70 and 90 at cooling areas 96 via local heat sinks such as cooling pads that serve to limit the heat conducted into the parts of the sandwich structures 70 and 90 that are away from the joint.

FIG. 7 is an isometric view showing the structures 70 and 90 butt welded together as shown in FIG. 6, where the butt weld is shown as a single continuous bead 94. Secondary welds at locations 100 and 102 show weld (or bond) lines where the insert 86 is secured to the face sheets 72 and 74.

Figure 9:
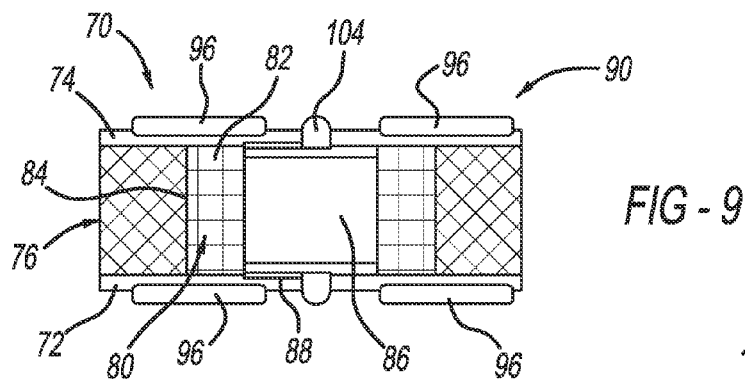
FIG. 9 is an illustration showing the two sandwich structures in FIG. 8 welded together.

An alternate embodiment is shown in FIG. 8, where like elements of the structures 70 and 90 are identified by the same reference numerals. In this embodiment, the welding insert 92 is not provided in the structure 90. The welding insert 86 is inserted into the open end of the structure 90 adjacent to the cooling region 80. Instead of butt welding the ends of the welding inserts 86 and 92 by the weld joint 94 as discussed above, the ends of the top face sheets of the structures 70 and 90 and ends of the bottom face sheets of the structures 70 and 90 are welded at weld joint 104, as shown in FIG. 9. As in the previous case, the cooling provided by a cooling fluid flowing through the cooling region 80 and, optionally via, the external cooling areas 96 on both structures serves to protect the parts of both structures 70 and 90 that are away from the weld location, from thermal damage during the welding process.

As discussed above, the fabrication techniques for the micro-truss core 76 can be such that a barrier is formed between the cooling region 80 and the rest of the core 76. For other types of sandwich structures that do not employ micro-truss cores, but may include other types of cores, such as foam cores, other techniques need to be employed to prevent the cooling fluid from flowing into the main core area. According to another embodiment of the invention, the end of a foam core is sealed by a suitable sealant, such as an epoxy, to form a barrier that confines the cooling fluid in a cooling channel area and prevents it from flowing into the core.

Figure 10:
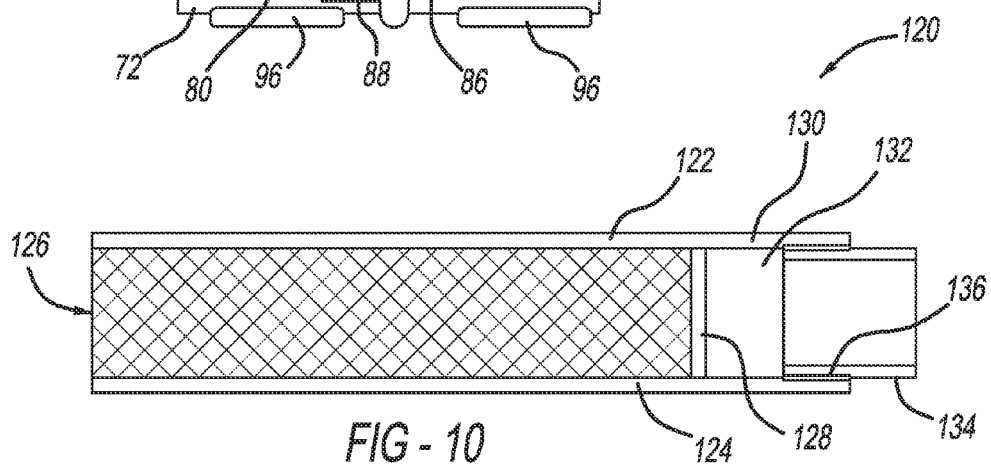
FIG. 10 is a side view of a sandwich structure including a cooling barrier.

FIG. 10 is a side view of a sandwich structure 120 including a top face sheet 122, a bottom face sheet 124 and a foam core 126 formed therebetween by known techniques to illustrate this embodiment. Prior to the structure 120 being assembled, an end of the core 126 is dipped into a sealant material and then cured to form a fluid barrier 128. After the barrier 128 has cured, i.e., hardened, the structure 120 is then assembled so that an end area 130 of the structure 120 is left open opposite to the barrier 128 from the core 126. A welding insert 134 is then partially inserted into the end area 130 so that it is spaced from the barrier 128 to form a cooling channel 132. The insert 134 extends from ends of the face sheets 122 and 124 and is secured at joint 136 (e.g. by welding or adhesive bonding) to be ready to be butt welded to another structure of similar design in the manner discussed above.

Figure 11:
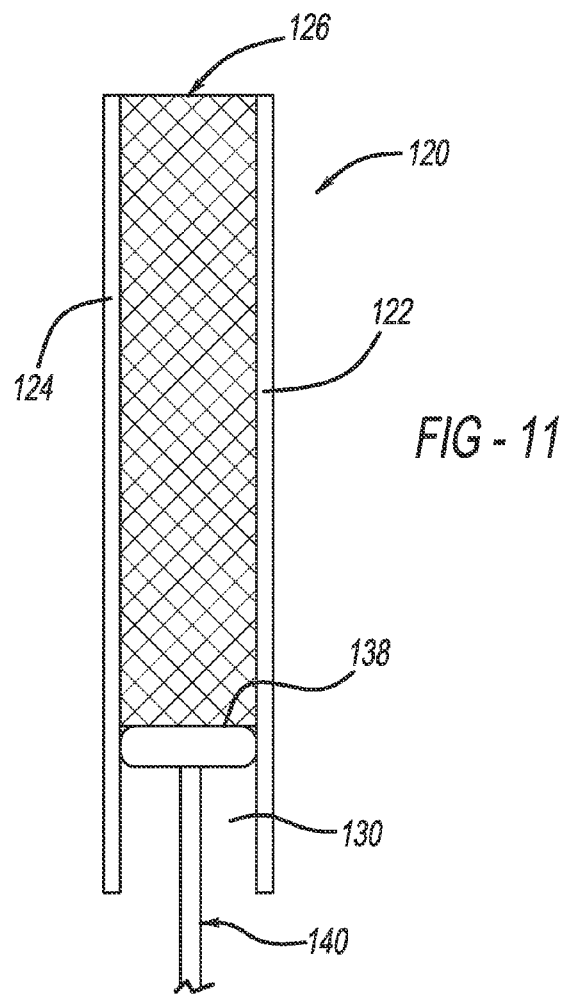
FIG. 11 is a side view of a sandwich structure showing a cooling barrier being applied by a roller applicator.

If dipping the core 126 in the sealant is not feasible, the barrier 128 can be formed by applying a sealant barrier 138 using a roller applicator 140, as shown in FIG. 11. In one embodiment, the structure 120 is positioned so that excess sealant drains away from the core 126.

Figure 12:
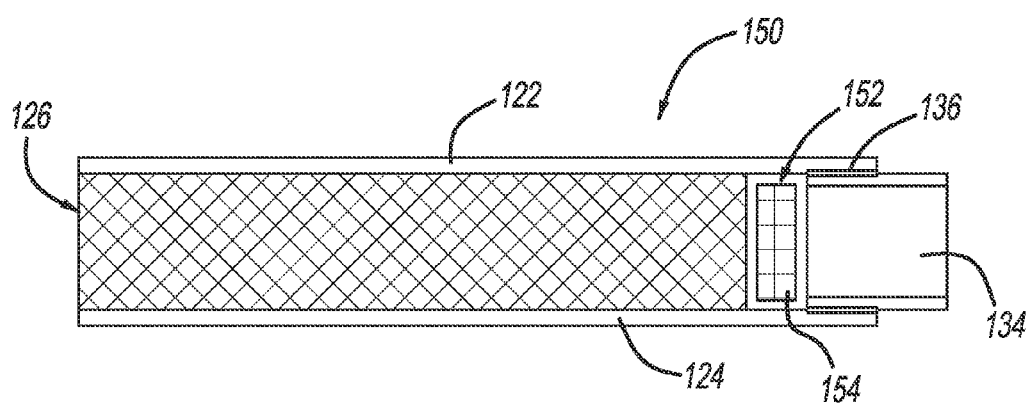
FIG. 12 is a side view of a sandwich structure including a cooling region insert.

FIG. 12 is a side view of a sandwich structure 150 depicting yet another embodiment, where like elements to the structure 120 are identified by the same reference numbers. Instead of providing a sealant barrier at the end of the core 126 an actual separate cooling region insert 152 is positioned in the opening 130 at the end of the core 126 that defines cooling channels 154 therein. The insert 152 provides support to the face sheets 122 and 124 in the open end area 130 and provides a barrier that prevents cooling fluid from flowing into the core 126 during the welding process. The insert 152 can be a micro-truss structure, especially if the core 126 is a micro-truss structure, and can be made of a material that can resist high temperatures and be capable of being bonded or attached to the core 126 and/or the face sheets 122 and 124.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for joining two structures, said method comprising:

providing a first sandwich structure including opposing first and second face sheets defining a space therebetween and a core positioned in the space between the first and second face sheets of the first structure so that an open area remains in the space between the first and second face sheets of the first structure at one end, said first structure further including a cooling region at an end of the core of the first structure adjacent to the open area, said cooling region of the first structure including a barrier preventing cooling fluid from entering the core of the first structure;

providing a welding insert in the open area of the first structure so that a portion of the welding insert extends beyond an end of the first and second face sheets of the first structure;

providing a second sandwich structure;

positioning the first structure against the second structure; and welding the first structure and the second structure together using the welding insert.

2. The method according to claim 1 wherein providing the welding insert includes inserting the welding insert into the open area or providing the welding insert as an integral part of the first sandwich structure.

3. The method according to claim 1 wherein providing the second sandwich structure includes providing opposing first and second face sheets defining a space therebetween and a core positioned in the space between the first and second face sheets of the second structure so that an open area remains in the space between the first and second face sheets of the second structure at one end, said second structure further including a cooling region positioned at an end of the core of the second structure adjacent to the open area, said cooling region of the second structure including a barrier preventing cooling fluid from entering the core of the second structure.

4. The method according to claim 3 further comprising providing the welding insert in the open area of the second structure so that a portion of the welding insert extends beyond an end of the first and second face sheets of the second structure, and wherein positioning the first structure against the second structure includes positioning ends of the welding insert in the first structure and the welding insert in the second structure against each other, and wherein welding the first structure and the second structure includes welding an end of the welding insert in the first structure to an end of the welding insert in the second structure.

5. The method according to claim 4 wherein welding the first structure to the second structure includes providing welds at locations where the face sheets and/or cooling regions are joined to the welding inserts.

6. The method according to claim 3 wherein positioning the first structure against the second structure includes inserting the welding insert in the first structure into the open area of the second structure so that ends of the first face sheet of the first structure and the first face sheet of the second structure abut against each other and ends of the second face sheet of the first structure and the second structure abut against each other, and wherein welding the first structure and the second structure includes welding the ends of the first face sheets and welding the ends of the second face sheets.

7. The method according to claim 3 wherein the core in the first and second structures are micro-truss cores and wherein the cooling regions in the first and second structures are formed by micro-truss structures.

8. The method according to claim 1 wherein the core in the first structure is a foam core.

9. The method according to claim 7 wherein the barrier is a sealant formed on an end of the core and the cooling region is an open region adjacent to the barrier in the open area.

10. The method according to claim 9 wherein the barrier is applied to the core by dipping the core in the sealant.

11. The method according to claim 9 wherein the barrier is formed by rolling the sealant on the end of the core.

12. The method according to claim 1 wherein the cooling region is formed by an insert provided within the open area.

13. A method for joining two structures, said method comprising:
providing a first sandwich structure including opposing first and second face sheets defining a space therebetween and a micro-truss core positioned in the space between the first and second face sheets of the first structure so that an open area remains in the space between the first and second face sheets of the first structure at one end, said first structure further including a micro-truss cooling region structure at an end of the core of the first structure adjacent to the open area, said cooling region structure of the first structure including a barrier preventing cooling fluid from entering the core of the first structure;
providing a welding insert in the open area of the first structure so that a portion of the welding insert extends beyond an end of the first and second face sheets of the first structure;
providing a second sandwich structure including opposing first and second face sheets defining a space therebetween and a micro-truss core positioned in the space between the first and second face sheets of the second structure so that an open area remains in the space between the first and second face sheets of the second structure at one end, said second structure further including a micro-truss cooling region structure at an end of the core of the second structure adjacent to the open area, said cooling region structure of the second structure including a barrier preventing cooling fluid from entering the core of the second structure;
positioning the first structure against the second structure; and
welding the first structure and the second structure together using the welding insert.

14. The method according to claim 13 further comprising providing the welding insert in the open area of the second structure so that a portion of the welding insert extends beyond an end of the first and second face sheets of the second structure, and wherein positioning the first structure against the second structure includes positioning ends of the welding insert in the first structure and the welding insert in the second structure against each other, and wherein welding the first structure and the second structure includes welding an end of the welding insert in the first structure to an end of the welding insert in the second structure.

15. The method according to claim 14 wherein welding the first structure to the second structure includes providing secondary welds at locations where the face sheets and/or cooling regions are joined to the welding inserts.

16. The method according to claim 13 wherein positioning the first structure against the second structure includes inserting the welding insert in the first structure into the open area of the second structure so that ends of the first face sheet of the first structure and the first face sheet of the second structure abut against each other and ends of the second face sheet of the first structure and the second structure abut against each other, and wherein welding the first structure and the second structure includes welding the ends of the first face sheets and welding the ends of the second face sheets.

17. A method for joining two structures, said method comprising:
providing a first sandwich structure including opposing first and second face sheets defining a space therebetween and a foam core positioned in the space between the first and second face sheets of the first structure so that an open area remains in the space between the first and second face sheets of the first structure at one end, said first structure further including a cooling region at an end of the core of the first structure adjacent to the open area, said cooling region of the first structure including a sealant barrier preventing cooling fluid from entering the core of the first structure;
providing a welding insert in the open area of the first structure so that a portion of the welding insert extends beyond an end of the first and second face sheets of the first structure;
providing a second sandwich structure including opposing first and second face sheets defining a space therebetween and a foam core positioned in the space between the first and second face sheets of the second structure so that an open area remains in the space between the first and second face sheets of the second structure at one end, said second structure further including a cooling region at an end of the core of the second structure adjacent to the open area, said cooling region of the second structure including a sealant barrier preventing cooling fluid from entering the core of the second structure;

positioning the first structure against the second structure; and welding the first structure and the second structure together using the welding insert.

18. The method according to claim 17 further comprising inserting the welding insert into the open area of the second structure so that a portion of the welding insert extends beyond an end of the first and second face sheets of the second structure, and wherein positioning the first structure against the second structure includes positioning ends of the welding insert in the first structure and the welding insert in the second structure against each other, and wherein welding the first structure and the second structure includes welding an end of the welding insert in the first structure to an end of the welding insert in the second structure.

19. The method according to claim 18 wherein welding the first structure to the second structure includes providing secondary welds at locations where the face sheets and/or the cooling regions are joined to the welding inserts.

20. The method according to claim 17 wherein positioning the first structure against the second structure includes inserting the welding insert in the first structure into the open area of the second structure so that ends of the first face sheet of the first structure and the first face sheet of the second structure abut against each other and ends of the second face sheet of the first structure and the second structure abut against each other, and wherein welding the first structure and the second structure includes welding the ends of the first face sheets and welding the ends of the second face sheets.

21. The method according to claim 17 wherein the barrier in the first and second structures is applied to the core by dipping the core in the sealant.

22. The method according to claim 17 wherein the barrier in the first and second structures is applied to the core by rolling the sealant on the end of the core.

* * * * *